United States Patent

Wlassics et al.

(10) Patent No.: US 6,759,494 B2
(45) Date of Patent: Jul. 6, 2004

(54) FLUOROELASTOMERS

(75) Inventors: Ivan Wlassics, Genoa (IT); Marco Apostolo, Novara (IT); Margherita Albano, Milan (IT)

(73) Assignee: Ausimont S.p.A., Milan (IT)

( * ) Notice: Subject to any disclaimer, the term of this patent is extended or adjusted under 35 U.S.C. 154(b) by 0 days.

(21) Appl. No.: 10/283,166

(22) Filed: Oct. 30, 2002

(65) Prior Publication Data

US 2003/0096930 A1 May 22, 2003

Related U.S. Application Data

(62) Division of application No. 09/370,254, filed on Aug. 9, 1999, now Pat. No. 6,500,903.

(30) Foreign Application Priority Data

Aug. 11, 1998 (IT) .......................................... MI98A1880

(51) Int. Cl.⁷ ........................ C08F 214/22; C08F 214/26
(52) U.S. Cl. ........................ 526/242; 526/227; 526/229; 526/247; 526/248; 526/249
(58) Field of Search ................................. 526/242, 227, 526/229, 247, 248, 249

(56) References Cited

U.S. PATENT DOCUMENTS

| | | |
|---|---|---|
| 3,810,874 A | 5/1974 | Mitsch et al. |
| 4,035,565 A | 7/1977 | Apotheker et al. |
| 4,243,770 A | 1/1981 | Tatemoto et al. |
| 4,564,662 A | 1/1986 | Albin |
| 4,694,045 A | 9/1987 | Moore |
| 4,745,165 A | 5/1988 | Arcella et al. |
| 4,789,717 A | 12/1988 | Giannetti et al. |
| 4,864,006 A | 9/1989 | Giannetti et al. |
| 5,151,492 A | 9/1992 | Abe et al. |
| 5,173,553 A | 12/1992 | Albano et al. |
| 5,910,587 A | * 6/1999 | Wlassics et al. ............. 544/216 |
| 6,310,142 B1 | * 10/2001 | Apostolo et al. ........... 525/200 |

FOREIGN PATENT DOCUMENTS

| | | |
|---|---|---|
| EP | 0 136 596 A2 | 4/1985 |
| EP | 0 199 138 A2 | 10/1986 |
| EP | 0 410 351 A1 | 1/1991 |
| EP | 0845482 A | 3/1998 |
| EP | 0 860 436 A1 | 8/1998 |

OTHER PUBLICATIONS

"Ullman's Encyclopedia of Industrial Chemistry", vol. A, 11, 1988, VCH Verlagsgesellschaft, pp. 417–429.

* cited by examiner

Primary Examiner—Judy M. Reddick
(74) Attorney, Agent, or Firm—Arent Fox PLLC.

(57) ABSTRACT

Curable fluoroelastomers comprising monomeric units formed by a triazine iodinated derivative having general formula:

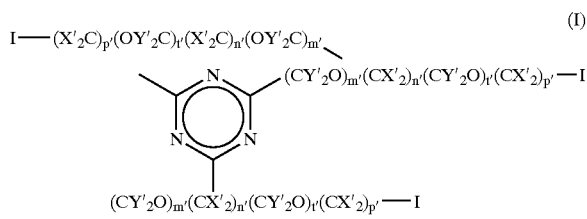

wherein $Y'$ is independently H, Cl, F, $CH_3$, or $CF_3$, $m'$ and $t'$ are 0 or 1, and $m'+t'=0$ or 1, preferably $m'+t'=0$; $p'$ is an integer and is equal to 1 when $t'=1$, or $p'=0$; $X'$ is independently H, Cl, F, alkyl or perfluoroalkyl $C_1$–$C_3$, preferably F; $n'$ is an integer between 2 and 20, preferably between 4 and 12, more preferably between 4 and 8.

13 Claims, No Drawings

FLUOROELASTOMERS

This is a divisional of application Ser. No. 09/370,254 filed Aug. 9, 1999, now U.S. Pat. No. 6,500,903. The disclosure of the prior application is hereby incorporated by reference herein in its entirety.

The present invention relates to fluoroelastomers curable with peroxides and having improved mechanical and elastomeric properties combined with improved processability and extrudability.

Various kinds of fluoroelastomers, are widely used in technical applications where products are required to have elastomeric properties combined with high thermochemical stability. A detailed description of such products is presented in "Ullmann's Encyclopedia of Industrial Chemistry", Volume A-11, pages 417–429 (1988, VCH Verlagsgesellschaft).

Fluoroelastomer curing can be carried out by ionic- and peroxide-based methods. In the former case, fluoroelastomer curing agents such as polyhydroxylated compounds are combined with accelerating agents such as tetraalkylammonium, tetraalkylphosphonium phosphoranamine or salts thereof. For peroxide-based curing, the polymer must contain reactive groups capable of forming radicals in the presence of peroxides. Monomers containing reactive groups such as iodine and/or bromine can be introduced into the polymeric skeleton as described in U.S. Pat. Nos. 4,035,565, 4,475,165 and EP 199,138. Chain transfer agents containing iodine and/or bromine, which generate iodinated and/or brominated end groups, can also be used in the polymerization-phase (U.S. Pat. Nos. 4,243,770 and 5,173,553).

A drawback of the compounds used for peroxidic curing is their difficult processability. Fluoroelastomers cured by peroxides compared with those cured by ionic compounds are reduced in their elastomeric properties, e.g., high compression set values and moldability, which results in decreased product yield.

There has been a longfelt need for peroxide-curable fluoroelastomers having improved mechanical and elastomeric properties combined with an improved extrudability.

The inventor has surprisingly and unexpectedly found new peroxide curable fluoroelastomers having improved mechanical and elastomeric properties combined with improved processability, in particular improved extrudability.

An object of the present invention is a peroxide-curable fluoroelastomer having iodine atoms at the terminal ends comprising monomeric unites formed by a triazine iodinated derivative of formula:

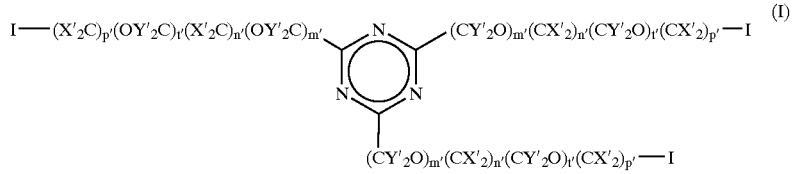

wherein $CY'_2$, $CX'_2$, $X'_2C$ and $Y'_2C$ represent carbon atoms bound to two $Y'$ and $X'$ substituents as defined below:

$Y'$ can independently be H, Cl, F, or $CH_3$;

$m'$ and $t'$ are 0 or 1, where $m'+t'=0$ or 1, preferably $m'+t'=0$;

$p'$ is 0 or 1, and is equal to 1 when $t'=1$;

$X'$ can independently be H, Cl, F, alkyl or perfluoroalkyl $C_1$–$C_3$, preferably F;

$n'$ is an integer in the range of 2–20, preferably 4–12, more preferably 4–8.

The preferred compounds of formula (I) are those wherein $m'=t'=p'=0$; $n'$ is between 4 and 8; and $X'=F$.

The concentration of the triazine iodinated derivatives in the polymer chain is generally in the range of 0.01–1.0 moles, preferably 0.03–0.5 moles, more preferably 0.05–0.2 moles per 100 moles of the other monomeric units forming the polymer.

The presence of a triazine iodinated derivative of formula (I) results in polymers having a very narrow molecular weight distribution as determined by GPC. The inventor has found that a narrow molecular weight distribution for the polymer is a contributing factor to the improved extrudability of the product.

The fluorelastomeric polymers described hereunder, besides having improved processability and extrudability, show a combination of improved mechanical and elastomeric properties, in particular a lower compression set point.

The fluoroelastomer base structure is selected from at least one of the class of copolymers comprising two or more monomers comprising:

(1) VDF-based copolymers, wherein VDF is copolymerized with at least one comonomer selected from the group consisting of:

perfluoroolefins $C_2$–$C_8$ such as tetrafluoroethylene (TFE) or hexafluoropropene (HFP), chloro-, bromo- or iodo-fluoroolefins $C_2$–$C_8$ such as chlorotrifluoroethylene (CTFE) and bromotrifluoroethylene, (per) fluoroalkylvinylethers (PAVE) $CF_2=CFOR_f$, wherein $R_f$ is a (per)-fluoroalkyl $C_1$–$C_6$ such as trifluoromethyl, bromodifluoromethyl, or pentafluoropropyl, perfluoro-oxyalkylvinylethers $CF_2=CFOX$, wherein X is a perfluorooxyalkyl $C_1$–$C_{12}$ having one or more ether groups such as perfluoro-2-propoxy-propyl, and non fluorinated olefins (Ol) $C_2$–$C_8$ such as ethylene and propylene; and (2) TFE based copolymers, wherein TFE is copolymerized with at least one of a comonomer selected from the group consisting of:

(per) fluoroalkylvinylethers (PAVE) $CF_2=CFOR_f$, wherein $R_f$ is as above defined, perfluorooxyalkylvinylethers $CF_2=CFOX$, wherein X is as above defined, fluoroolefins $C_2$–$C_8$ containing hydrogen, chlorine, bromine or iodine atoms and non-fluorinated olefins (Ol) $C_2$–$C_8$.

Preferably the fluoroelastomers contain perfluorinated monomers, and more preferably, the base structure of the fluoroelastomers are selected from the copolymers of class (2), wherein TFE is polymerized with one or more perfluorinated comonomers as above indicated.

The preferred compositions of the monomers forming the fluoroelastomer base structure comprise (a) VDF 45–85%, HFP 15–45%, TFE 0–30%;
(b) VDF 50–80%, PAVE 5–50%, TFE 0–20%;
(c) VDF 20–30%, Ol 10–30%, HFP e/o PAVE 18–27%, TFE 10–30%;

(d) TFE 50–80%, PAVE 20–50%;
(e) TFE 45–65%, Ol 20–55%, VDF 0–30%;
(f) TFE 32–60%, Ol 10–40%, PAVE 20–40%; and
(g) TFE 33–75%, PAVE 15–45%, VDF 5–30%.

Specific compositions particularly preferred are the following:
d) TFE 50–80%, PAVE 20–50%;
g) TFE 33–75%, PAVE 15–45%, VDF 5–30%.

The fluoroelastomers optionally comprise monomeric units derived from a bis-olefin of formula:

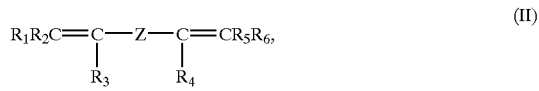
(II)

wherein
$R_1$, $R_2$, $R_3$, $R_4$, $R_5$ and $R_6$ are equal to or different from each other, and are H or $C_1$–$C_5$ alkyl;
Z is an alkylenic or cycloalkylenic $C_1$–$C_{18}$ radical, linear or branched, optionally containing oxygen atoms. Preferably z is at least partially fluorinated or a (per)fluoropolyoxyalkylene radical.

In formula (II), Z is preferably a perfluoroalkylene $C_4$–$C_{12}$ radical, while $R_1$, $R_2$, $R_3$, $R_4$, $R_5$ and $R_6$ are preferably hydrogen.

When Z is a (per) fluoropolyoxyalkylene radical, preferably the formula is

(III), wherein
Q is an alkylene or oxyalkylene $C_1$–$C_{10}$ radical;
p is 0 or 1;
m and n are integers such that the m/n ratio is in the range of 0.2–5 and the molecular weight of the (per)fluoropolyoxyalkylene radical is in the range of 500–10,000, preferably 1,000–4,000.

Preferably Q is selected from the group consisting of —$CH_2OCH_2$—; and —$CH_2O(CH_2CH_2O)_sCH_2$—, where s is an integer from 1 to 3.

Bis-olefins of formula (II), wherein Z is an alkylene or cycloalkylene radical can be prepared according to the methods of I. L. Knunyants et al Izv. Akad. Nauk. SSSR, Ser. Khim., 1964(2), 384–6), while the bisolefins containing (per)fluoropolyoxyalkylene sequences are described in U.S. Pat. No. 3,810,874.

The concentration of the bis-olefins in the polymeric chain is generally in the range of 0.01–1.0 moles, preferably 0.03–0.5 moles, more preferably 0.05–0.2 moles per 100 moles of the other above mentioned monomeric unites forming the polymer base structure.

The fluoroelastomers of the present invention in addition to having iodinated end groups derived from the triazine derivative, can optionally contain iodine and/or bromine atoms. Iodine and/or bromine atoms can be introduced to the reaction mixture by the addition of brominated and/or iodinated cure-site comonomers such as bromo- and/or iodo-olefins having from 2 to 10 carbon atoms as described in U.S. Pat. Nos. 4,035,565 and 4,694,045, or iodo- and/or bromo-fluoroalkylvinylethers as described in U.S. Pat. Nos. 4,475,165, 5,564,662 and EP 199,138). The concentration for the cure-site comonomers in the final product is generally in the range of 0.05–2 moles per 100 moles of the other base monomeric units.

A process for preparing the fluoroelastomers is another object of the present invention. The process can be carried out by copolymerization of the monomers in aqueous emulsion in the presence of radical initiators such as alkaline or ammonium persulphates, perphosphates, perborates or percarbonates, or optionally in association with ferrous, cuprous or silver salts, or other easily oxidable metals. The reaction medium can also contain various surfactants among which are the fluorinated surfactants of formula $R_{f2}$—$X_2$—$M^+$, wherein $R_{f2}$ is a (per)fluoroalkyl chain $C_5$–$C_{16}$ or a (per)fluoropolyoxyalkylene chain, $X_2$— is —$COO^-$ or —$SO_3^-$, and $M^+$ is selected from the group consisting of $H^+$, $NH_4^+$, and alkaline metal ion.

More preferably, ammonium perfluorooctanoate and (per)fluoropolyykylens ending with one or more carboxylic groups are used as surfactants.

The amount of triazine derivative (I) added to the reaction mixture can be adjusted depending on the desired final concentration for the final product.

Upon completion of the polymerization reaction, the fluoroelastomer can be isolated by coagulation (adding electrolytes) or by cooling.

Alternatively, polymerization can be carried out in bulk or in a suspension comprising an organic liquid in the presence of a radical initiator.

The polymerization is generally carried out at temperatures in the range of 25–150° C. under pressure up to 10 Mpa.

The preparation of the fluoroelastomers of the present invention is preferably carried out in aqueous emulsion in the presence of a perfluoropolyoxyalkylene emulsion, dispersion or microemulsion according to U.S. Pat. Nos. 4,478,717 and 4,864,006.

Peroxide curing of fluoroelastomers is carried out by addition of a peroxide capable of generating radicals upon heating. Among the most commonly used peroxides are dialkylperoxides such as di-terbutyl-peroxide and 2,5-dimethyl-2,5-di(terbutylperoxy)hexane; dicumyl peroxide; dibenzoyl peroxide; diterbutyl perbenzoate; and di[1,3-dimethyl-3-(terbutylperoxy)butyl-]carbonate. Other peroxides are described in EP 136,596 and EP 410,351.

The fluoroelastomer compound may contain additives such as:
(a) curing coagents in amounts in the range of 0.5–10%, preferably 1–7%, by weight with respect to the polymer. Curing coagents commonly used are triallyl-cyanurate, triallyl-isocyanurate (TAIC), tris (diallylamine)-s-triazine, triallylphosphite, N,N-diallyl-acrylamide, N,N,N',N'-tetraallyl-malonamide, trivinyl-isocyanurate, 2,4,6-trivinyl-methyltrisiloxane, N,N'bisallylbicyclo-oct-7-ene-disuccinimide (BOSA), bis olefin of formula (I), and triazines having formula

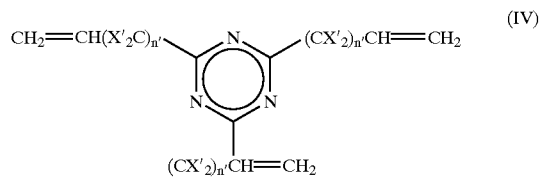
(IV)

wherein $CX'_2$, X' and n' are as defined in formula (I).
Preferably in formula (IV), n' is from 4 to 8, and TAIC is particularly preferred;
(b) a metal compound in amounts in the range of 1–15% by weight, preferably 2–10%, with respect to the polymer. Metals are selected from the group of divalent metal oxides or hydroxides such as Mg, Zn, Ca, Pb, and optionally associated with a monovalent or bivalent metal salt of an organic or inorganic weak acid such as Ba, Na, K, Pb, Ca stearates, benzoates, carbonates, oxalates or phosphates;

(c) mineral fillers such as carbon black, barium sulphate, PTFE with a particle diameter lower than 300 nm, preferably lower than 100 nm, more preferably from 30 to 70 nm. PTFE of 30–70 nm in size is preferable. Alternatively, polytetrafluoroethylene (PTFE) or TFE plastomeric polymers such as TFE polymers modified with amounts from 0.01% to 10% by moles, preferably from 0.01 to 4% by moles of a vinylether, preferably perfluoromethylvinylether, perfluoroethylvinyl ether, perfluoropropylvinylether can be used. Preferably, plastomeric polymers are TFE modified with MVE; and (d) other additives such as thickeners, pigments, antioxidants, stabilizers and the like.

A process for curing fluoroelastomers may also encompass a mixed system where both ionic and peroxidic compounds are used as curing agents as described in EP 136,596.

The inventive fluoroelastomers show improved extrudability as well as processability, thus allowing one to obtain a higher production yield and a reduction in the generation of processing waste materials.

With the fluoroelastomers of the present invention, it is possible to prepare manufactured articles such as fuel hoses, O-rings, shaft seals, and gaskets, preferably fuel hoses having improved compression set and a very good extruded product (Garvey rating).

The triazine derivatives of formula (I) can be prepared by the following process as described in U.S. Pat. No. 5,910,587:

a) reaction of a compound of formula:

I—(CX'$_2$—CY'$_2$O)$_{m'}$—(CX'$_2$)$_{n'+1+m'}$—I, wherein CY'$_2$, CX'$_2$, X', Y', m' and n' are as defined in formula (I), in the presence of an oxide or a transition metal salt (e.g., HgSO$_4$), and of oleum containing an amount of SO$_3$ comprising between 5 to 60% by weight, preferably between 10 to 40% by weight, to obtain an omega iodoacylfluoride, b) reacting the omega iodoacylfluoride with ammonia in an inert solvent such as methylene chloride, ethylic ether, perfluoroheptane or the like, for between 10 minutes to 2 hours to obtain the corresponding amide, c) reacting the amide with a dehydrating agent (e.g., P$_2$O$_5$) to obtain the corresponding nitrile, d) reacting the nitrile with ammonia at a temperature between −10 and −100° C. to obtain the corresponding amidine, e) condensing the amide at a temperature between 120 and 170° C. to obtain the triazine (I).

The reaction temperature can vary widely, more preferably between 80 to 150° C.

The present invention is better illustrated by the following working examples which define the purpose of the invention but are non-limiting as to the scope thereof.

EXAMPLE 1

Characterization

EXAMPLE 1a

Molecular Weight Determination by GPC

Average molecular weights Mn (number), Mw (weight), and Mz were determined by GPC using a column series comprising Ultrastyragel® thermostatically set at 35° C., tetrahydrofuran as eluent, and a Rifractive Index detector.

EXAMPLE 1b

Mooney Viscosity ML(1+10') Determination

Mooney Viscosity ML(1+10') was determined according the ASTM D1646 method at a temperature of 121° C.

EXAMPLE 1c

Curing Curve Determination

Curing curve on fluoroelastomer obtained according to Examples 2 and 3, hereinafter described, was determined by oscillating Disk Rheometer (ODR) (Model 100 S) by Monsanto, according to the ASTM D2084-81 method, operating at 177° C. with an oscillation amplitude of 3°.

Data are listed in the Tables:

ML (lower torque); MH (higher torque); $t_{s2}$ (time required for a torque increase of 2 lb. in over ML); $t_{s50}$ (time required for a torque increase of 50 lb. in over ML); t'$_{90}$ (time required for a torque increase of 50% and 90%, respectively).

On the cured product compression set on O-ring at 200° C. for 70 hrs after post-curing at 200° C. for 8 hrs (ASTM D395);

mechanical properties of post-curing at 200° C. for 8 hrs (ASTM D412-83) were determined and are listed in the Tables.

EXAMPLE 1d

Garvey Rating Determination

Garvey rating was determined according to the ASTM D2230-78 method.

EXAMPLE 2

Fluoroelastomer Synthesis According to the Invention by Monomer Polymerization in the Presence of a Triazine Iodinate Derivative In a 5 liter autoclave, equipped with a stirrer working at 630 rpm, 3.5 liter of demineralized water and 182 ml of a perfluoropolyoxyalkylene microemulsion was introduced after evacuation. The microemulsion was previously prepared by mixing:

39.3 ml of a perfluoropolyoxyalkylene with an acid end group of formula:

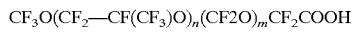

$$CF_3O(CF_2-CF(CF_3)O)_n(CF2O)_mCF_2COOH$$

wherein m/n=10, having average molecular weight of 600;

39.3 ml of an NH$_4$OH aqueous solution at 30% by volume;

78.8 ml of demineralized water; and 24.4 ml of Galden® DO2 of formula:

$$CF_3O(CF_2-CF(CF_3)O)_n(CF_2O)_mCF_3$$

wherein m/n=20, having average molecular weight of 450. The autoclave was then heated to 80° C. and maintained at this temperature for the duration of the reaction. The following monomer mixture was then added:

| | |
|---|---|
| vinylidene fluoride (VDF) | 47.5% by moles |
| hexafluoropropene (HFP) | 45% by moles |
| tetrafluoroethylene (TFE) | 7.5% by moles | to bring the pressure up to 21 bar. The following reagents were then added to the autoclave:

0.175 g of amonium persulphate (APS) as initiator; and 14.3 g of the triazine derivative of formula (V):

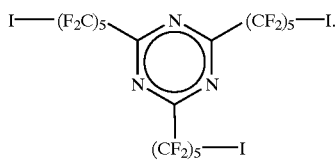

(V)

The pressure of 21 bars was maintained constant during the entire polymerization reaction by adding a mixture composed of:

| | |
|---|---|
| VDF | 70% by moles |
| HFP | 19% by moles |
| TFE | 11% by moles |

After 280 minutes of reaction, the autoclave was cooled, and the latex discharged. 450 g/l of a product having polymer Mooney viscosity, ML (1+10) at 121° C., equal to 40, was obtained. The iodine percentage for the polymer is equal to 0.25% by weight. The molar composition determined by F—NMR is the following:

| | |
|---|---|
| VDF | 71% by moles |
| HFP | 17.5% by moles |
| TFE | 11.5% by moles |

The latex was coagulated, dried and cured by peroxide treatment. Characteristics of the polymer and of the cured compound are listed in Tables 1 and 2.

Specifically it is noted that the inventive fluoroelastomer exhibits a very narrow molecular weight distribution (Table 1), and that the Garvey rating and compression set values are more favourable than the values for the comparative, reference fluoroelastomer (Table 2).

EXAMPLE 3 (COMPARATIVE)

Fluoroelastomer Synthesis According to the Prior Art By Polymerizing Monomers in the Presence of an Aliphatic Diiodinate Derivative Following the same procedure described for the polymerization in Example 1, a polymer was prepared wherein a diiodinate derivative was used in an amount based on the iodine moles equivalent to those of the triazine derivative of Example 2.

The 1,6-diiodoperfluorohexane amount was of 9.8 g.

After 210 minutes of reaction, the autoclave was cooled, and the latex discharged. 441 g/l of product having polymer Mooney viscosity, ML(1+10) at 121° C., equal to 44, was obtained. The weight percent iodine for the polymer is equal to 0.2%. The molar composition determined by NMR is the following:

| | |
|---|---|
| VDF | 70.5% by moles |
| HFP | 18.0% by moles |
| TFE | 11.5% by moles |

The latex was coagulated, dried and cured by peroxide treatment. Characteristics of the polymer and the cured compound are listed in Tables 1 and 2.

TABLE 1

| | Example | |
|---|---|---|
| | 2 | 3(+) |
| Average molecular weight (method GPC) and polydispersity | | |
| $Mn \times 10^{-3}$ | 116 | 120 |
| $Mw \times 10^{-3}$ | 220 | 276 |
| $Mz \times 10^{-3}$ | 400 | 552 |
| Mw/Mn | 1, 9 | 2, 3 |

(+)comparative

TABLE 2

| | | Example | |
|---|---|---|---|
| | | 2 | 3(+) |
| Compound composition | | | |
| Polymer | (g) | 100 | 100 |
| Luperco(R) 101 XL | (phr) | 2 | 2 |
| Drimix(R) TAIC | (phr) | 4, 5 | 4, 5 |
| ZnO | (phr) | 4 | 4 |
| Akrochem blue 602C | (phr) | 0, 3 | 0, 3 |
| BaSO4 | (phr) | 35 | 35 |
| Tremin 283 600 Est | (phr) | 35 | 35 |
| Compound characteristics | | | |
| ODR 177° C. arc 3, 12' | (ASTM D2084-81) | | |
| ML | (pounds · inch) | 10 | 12 |
| MH | (pounds · inch) | 108 | 95 |
| $t_{S2}$ | (sec) | 45, 5 | 57 |
| $t_{S50}$ | (sec) | 78, 5 | 90 |
| $t'_{90}$ | (sec) | 100 | 130 |
| Extrudibility tests (ASTM D-2230-78) | | | |
| Flow rate (g/min) (Method B) | | | |
| Garvey rating (Method A, SystemB) | | 10 | 7 |
| Characteristics after post-curing at 230° C. for 24 hrs | | | |
| *MECHANICAL PROPERTIES | (ASTMA D412-83) | 5, 0 | 3, 5 |
| ModulUS at 100% | (MPa) | 20, 6 | 19, 0 |
| Stress at Break | (MPa) | 299 | 320 |
| elongation at break | (%) | 73 | 67 |
| Hardness Shore A | (points) | | |
| *COMPRESSION SET AT 200° C. for 70 Hrs (ASTMA D395 Method B) O-ring 214 | (%) | 44 | 54 |

*comparative

What is claimed is:

1. Vinylidene fluoride (VDF)-based or tetrafluoroethylene (TFE)-based fluoroelastomers curable with peroxides and having terminal position iodine atoms derived by free-radical polymerization in the presence of iodinated triazine derivative of formula:

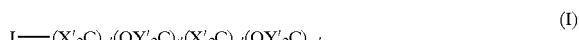
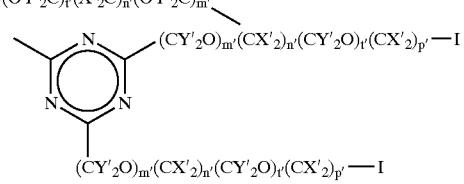

(I)

wherein

CY'$_2$, CX'$_2$, X'$_2$C and Y'$_2$C represent carbon atoms bound to two Y' or X' substituents;

wherein Y' is H, Cl, F, CH$_3$, or CF$_3$, and X' is H, Cl, F, alkyl or C$_1$–C$_3$ perfluoroalkyl;

m' and t' are 0 or 1, and m' plus t' is 0 or 1;

p' is 0 or 1, and is equal to 1 when t' is 1; and n' is an integer in the range of 2–20, in the presence of a free radical initiator.

2. Fluoroelastomers according to claim 1, wherein the compounds of formula (I) are those in which m'=t'=p'=0; n' is in the range 4–8; X'=F.

3. Fluoroelastomers according to claim 1, wherein the unit amount in the chain of the triazine iodinated derivatives is in the range 0.01–1.0 moles per 100 moles of the other monomeric units forming the polymer.

4. Fluoroelastomers according to claim 1, wherein a fluoroelastomer base structure is selected from the following classes of copolymers:

(1) VDF-based copolymers, wherein VDF is copolymerized with at least a comonomer selected from the group consisting of: C$_2$–C$_8$ perfluoroolefins; C$_2$–C$_3$ chloro- and/or bromo- and/or iodo-fluoroolefins; CF$_2$=CFOR$_f$ perfluoro(alkyl vinyl ethers) (PAVE), wherein R$_f$ is a C$_1$–C$_6$ perfluoroalkyl; CF$_2$=CFOX perfluoro(oxyalkyl vinyl ethers), wherein X is a C$_1$–C$_{12}$ perfluorooxyalkyl having one or more ethereal groups; and C$_2$–C$_8$ non-fluorinated olefins (Ol);

(2) TFE-based copolymers, wherein TFE is copolymerized with at least a comonomer selected from the following:

CF$_2$=CFOR$_f$ perfluoro(alkyl vinyl ethers) (PAVE), wherein R$_f$ is as above defined; CF$_2$=CFOX perfluoro (oxyalkyl vinyl ethers,) wherein X is as above defined; C$_2$–C$_8$ fluoro-olefins containing hydrogen and/or chlorine and/or bromine and/or iodine atoms; C$_2$–C$_8$ non-fluorinated olefins (Ol).

5. Fluoroelastomers according to claim 4, wherein the compositions of the monomers forming the basic structure of said fluoroelastomers are selected from the group consisting of:

(a) VDF 45–85% by moles, hexafluoropropene (HFP) 15–45% by moles, TFE 0–30% by moles; (b) VDF 50–80% by moles, PAVE 5–50% by moles, TFE 0–20% by moles, (c) VDF 20–30% by moles, Ol 10–30% by moles, HFP e/o PAVE 18–27% by moles, TFE 10–30% by moles; (d) TFE 50–80% by moles; PAVE 20–50% by moles; (e) TFE 45–65% by moles, Ol 20–55% by moles, VDF 0–30% by moles; (f) TFE 32–60% by moles, Ol 10–40% by moles; PAVE 20–40% by moles; and (g) TFE 33–75% by moles; PAVE 15–45% by moles, VDF 5–30% by moles.

6. Fluoroelastomers according to claim 5, wherein the monomer compositions are selected from the group consisting of:

(d) TFE 50–80% by moles, PAVE 20–50% by moles; and
(g) TFE 33–75% by moles, PAVE 15–45% by moles, VDF 5–30% by moles.

7. Fluoroelastomers according to claim 4, wherein the fluoroelastomer base structure is selected from the copolymers of class (2).

8. Fluoroelastomers according to claim 4, formed from perfluorinated monomers.

9. Fluoroelastomers according to claim 1, comprising monomeric units derived from a bis-olefin having the formula:

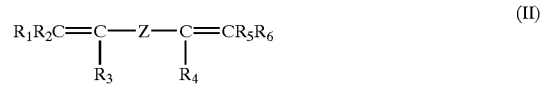

(II)

wherein:

R$_1$, R$_2$, R$_3$, R$_4$, R$_5$, R$_6$, equal to or different from each other, are H or C$_1$–C$_5$ alkyls:

Z is a C$_1$–C$_{18}$ alkylene or cycloalkylene radical, linear or branched, optionally containing oxygen atoms, a partially fluorinated C$_1$–C$_{18}$ alkylene or cycloalkylene radical, a perfluoropolyoxyalkylene or a fluoropolyoxyalkylene radical.

10. Fluoroelastomers according to clam 9, wherein in formula (II), Z is a C$_4$C$_{12}$ perfluoroalkylene radical, and R$_1$, R$_2$, R$_3$, R$_4$, R$_5$, R$_6$ are hydrogen.

11. Fluoroelastomers according to claim 9, wherein Z is a perfluoropolyoxyalkylene or fluoropolyoxyalkylene radical, having the formula:

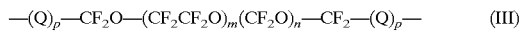

(III)

wherein: Q is an C$_1$–C$_{10}$ alkylene or oxyalkylene radical;

p is 0 or 1; m and n are integers such that the m/n ratio is in the range 0.2–5 and the molecular weight of said perfluoropolyoxyalkylene or fluoropolyoxyalkylene radical is in the range 500–10,000.

12. Fluoroelastomers according to claim 9, wherein the unit amount in the chain derived from such bis-olefins is in the range 0.01–1.0 moles per 100 moles of the other basic monomeric units.

13. Fluoroelastomers according to claim 3, wherein the unit amount in the chain of the triazine iodinated derivatives is in the range 0.03–0.5 moles per 100 moles of the other monomeric units forming the polymer.

* * * * *